March 26, 1963 F. B. NEWCOMB ETAL 3,082,904
CONTAINER
Filed Dec. 15, 1959
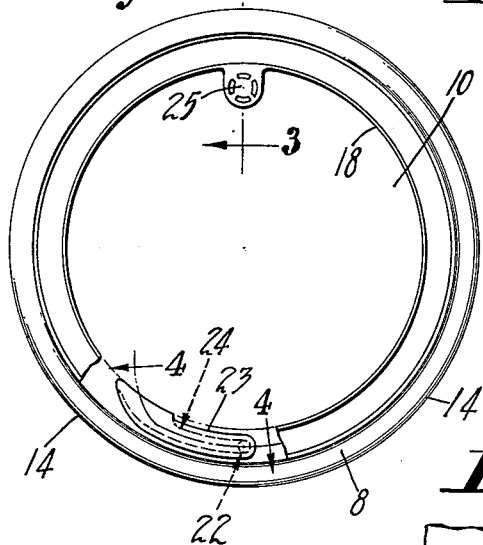
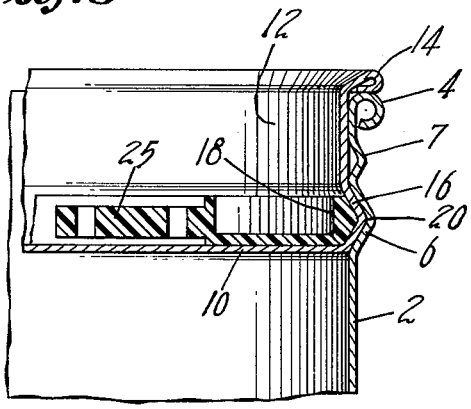
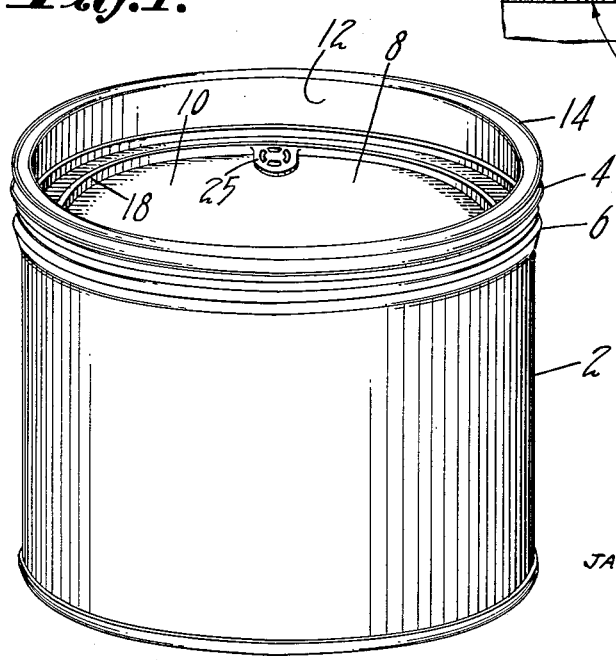
INVENTORS
FRANCIS BRUCE NEWCOMB
JAMES WILLIAM FITZSIMMONS
BY
ATTORNEYS

United States Patent Office 3,082,904
Patented Mar. 26, 1963

3,082,904
CONTAINER
Francis Bruce Newcomb, New York, and James William Fitzsimmons, East Rockaway, N.Y., assignors to American Can Company, New York, N.Y., a corporation of New Jersey
Filed Dec. 15, 1959, Ser. No. 859,682
3 Claims. (Cl. 220—44)

This invention relates to containers and more particularly to a pressure-vented container.

It is known in the canning industry that certain foods build up pressures under certain conditions. Coffee, for example, after being ground, gives off carbon dioxide gas in such great amounts that it is necessary to store freshly ground coffee for a time before it can be packed. It follows that if coffee could be packed immediately after grinding, much of its flavor could be retained. Other foods or substances may also be packed in containers under conditions which may require a subsequent venting of pressures generated within the container.

Accordingly, it is the first objective of this invention to provide an improved container for pressure generating foods and substances.

It is a further object of this invention to provide a vented container wherein the pressure in the container can be automatically regulated not to exceed a predetermined limit.

It is well known that the tear strip type container used by the coffee industry presents opening problems, and a further object of this invention is to provide a container especially well suited for pressure generated foods having easy opening features.

It is a still further object of this invention to provide a container for pressure generating substances having in combination a venting cover which is easily removed and yet is tamperproof.

Numerous other objects and advantages of the invention will be apparent as it is better understood from the following description, which, taken in connection with the accompanying drawing, discloses a preferred embodiment thereof.

Referring to the drawing:

FIGURE 1 is a perspective view of the improved container;

FIG. 2 is a top elevation of the container shown in FIG. 1;

FIG. 3 is a fragmentary side elevation partially in section taken through plane 3—3 of FIG. 2 in the direction of the arrows; and FIGS. 4 and 5 are fragmentary sections taken through plane 4—4 of FIG. 2 in the direction of the arrows showing the venting portion of the container in both sealing and venting positions respectively.

Briefly, this invention comprises a combination of a container having an easy opening lid including a vent having a normally closed position and a venting position. A tamperproof locking ring for the container cap also functions to maintain the vent in its normally closed position until pressure within the container overcomes the restrictive forces of the locking ring.

With reference to the drawing a container 2 is shown having a curled upper lip to provide a smooth handling surface and a sealing bead 6 which serves to hold the container lid 8. The container lid 8, which may be formed of any suitable material, comprises a flat surface or bottom 10 and a peripherally upstanding flange 12 which is curled at its outer edge 14 to provide a smooth handling surface. Flange 12 also is provided with a beaded portion 16 which is contoured to engage the sealing bead 6 of the container 2.

In order to provide a good seal between the beaded portion 16 of the cover and the beaded sealing portion 6 of the container, it is necessary to provide a radial force to insure contact between the beads. To accomplish this, a locking ring 18 made of some resilient material, e.g. plastic, and having an outer diameter slightly larger than the inner diameter of the cover bead 16 is inserted into the cover to lie parallel to the bottom 10. With this construction the ring 18, being slightly larger than the corresponding diameter of cover 12, exerts a radial force urging the cover bead 16 into the sealing bead 6.

In addition to providing the aforementioned radial forces, ring 18 tends to maintain its planar shape and lies flat against the surface of the cover bottom 10, but yet it can be deflected about the fulcrum point 20 if vertical pressure is exerted on it near its inner rim edge. This feature of the locking ring 18 is employed to control the pressure within the container. Specifically, a vent 22 is provided in cover 12 so as to underlie locking ring 18. The vent 22 is covered with a strip of flexible plastic tape 23 which is adhered to the surface of the bottom 10 in such a manner as to define the passageway 24 which permits gases from within the container to pass through the vent 22 and then along the passageway 24 to the atmosphere when a predetermined pressure is exceeded.

The flexible tape 23 may be as described in the co-pending James H. Groves application Serial No. 721,283, filed March 13, 1958, now Patent 2,923,403, issued February 12, 1960, for a Pressure Relief Valve, and acts as a one way valve permitting gases to escape from the container but being resealable to prevent air from passing through vent 22 into the container. The natural tendency of the tape 23 to act as a one way valve is supplemented by the pressure of the overlying locking ring tending to lie in one plane. The size and tension of the locking ring, therefore, may be controlling factors with regard to the amount of pressure that is required in the container to deflect the locking ring about the fulcrum point 20 and permit gases generated within the container to pass through the vent 22.

It is found in the preferred embodiment that the locking ring 18 should be so constructed that it does not deflect unless there is a pressure greater than three (3) pounds per square inch within the container. With such an arrangement, maintaining sufficient pressure, and assuming the container to be packed with coffee, a favorable aroma will be given off as the container is opened.

In order to open the container, the locking ring 18 must first be removed from the cover. The locking ring, therefore, is preferably made of a plastic material, such as polystyrene, that is resilient yet frangible for forces exceeding its resilience, so that it may be broken in order to remove it from the cover. A finger tab 25 may be manually gripped to break the locking ring 18. Once the locking ring has been broken and removed, the pressure between the cover 12 and the container 2 is such that a conventional prying device may be employed to remove the cover.

It will be noted that when the container is sealed with the locking ring 18 in place on the container cover 10 and overlying the venting tape valve 23, the tape is concealed under the ring 18 and is therefore tamperproof unless the ring 18 is broken to open the container.

If desired, a second cover retainer bead 7 may be provided above the sealing bead 6. Bead 7, as shown in FIG. 3, is closer to the mouth of the container than sealing bead 6 and aids in providing a reclosure feature, i.e. to reclose the container, the lid is reinserted with the cover bead 16 engaging the cover retaining bead 7, whereby successive openings of the container will be much easier than if the cover had to be removed from the deeper sealing bead 6. Of course, it is not essential that the second bead 7 be provided in all forms of the invention.

It also has been found helpful to use a compound material (not shown) in the bead 6 which is of a waxy composition to provide both lubrication for the removal of the cover and to act as a seal to prevent the escape of gas from the container. There are many well-known compositions with these qualities, and it is not believed necessary to list these compositions herein.

Although the description of the invention has been made in connection with a metal can construction, it should be understood that the arrangements of the invention may be used in the formation of containers formed of various materials that are non-permeable to gas and liquids. For example, certain plastic compositions or laminated paper aluminum foil stock may be used to form the container ends or the container body or both. There might be some advantage in using such alternate materials in place of the conventional tin plate, since these materials are more flexible and would facilitate the opening and reclosing operations for the container.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

We claim:

1. A container for venting internal gaseous pressure in excess of a predetermined pressure above atmospheric and preventing escape of pressure below said predetermined pressure, comprising in combination
    a body having an open end surrounded by an outwardly projecting peripheral bead,
    a removable cover disposed within said end and having an outwardly projecting peripheral bead seated within said body bead,
    said cover having a flat bottom wall portion provided with a vent aperture adjacent said bead,
    means for locking said cover to said body and for preventing escape of internal pressure below a predetermined pressure through said aperture while permitting escape therethrough of pressure in excess thereof,
    said means comprising a resilient plastic ring of normally greater diameter than the inside diameter of said cover,
    said ring having a flat bottom surface seated upon and resiliently urged against said cover bottom wall portion and having a peripheral bead projecting into said cover bead to radially urge said cover bead into said body bead and lock said cover to said body,
    and a flexible sheet secured to the outer surface of said cover bottom wall portion beneath said ring and in overlying relation to said vent aperture,
    said sheet defining with said cover bottom wall portion a passageway normally biased closed by said ring,
    said passageway communicating at its inner end with said aperture and at its outer end with the atmosphere inwardly of said ring,
    whereby excess pressure at said aperture will yieldably tilt said ring and open said normally closed passageway to vent excess pressure therethrough,
    said ring remaining resiliently urged against said cover bottom wall to seat said flexible sheet over said aperture when said gaseous pressure is below said predetermined pressure to thereby prevent escape of said lower pressure through said aperture.

2. The container structure of claim 1 wherein said ring is provided with a manually rupturable portion to enable the ring to be broken and removed from said cover to permit the cover to be removed from said body by a prying action exerted therebetween.

3. The container structure of claim 1 wherein said body and cover beads are vertically spaced above said cover bottom wall portion, and said ring is provided with an integral upstanding annular flange with said ring bead projecting therefrom, to thereby provide a fulcrum mounting defined by said interengaged beads vertically spaced from said ring bottom surface.

References Cited in the file of this patent
UNITED STATES PATENTS

| | | |
|---|---|---|
| 786,957 | Crane | Apr. 11, 1905 |
| 801,683 | Penfold | Oct. 10, 1905 |
| 1,666,702 | Hodgson | Apr. 17, 1928 |
| 2,060,145 | Vogel | Nov. 10, 1936 |
| 2,694,501 | Johansen | Nov. 16, 1954 |
| 2,923,403 | Groves | Feb. 2, 1960 |